No. 755,356. Patented March 22, 1904.

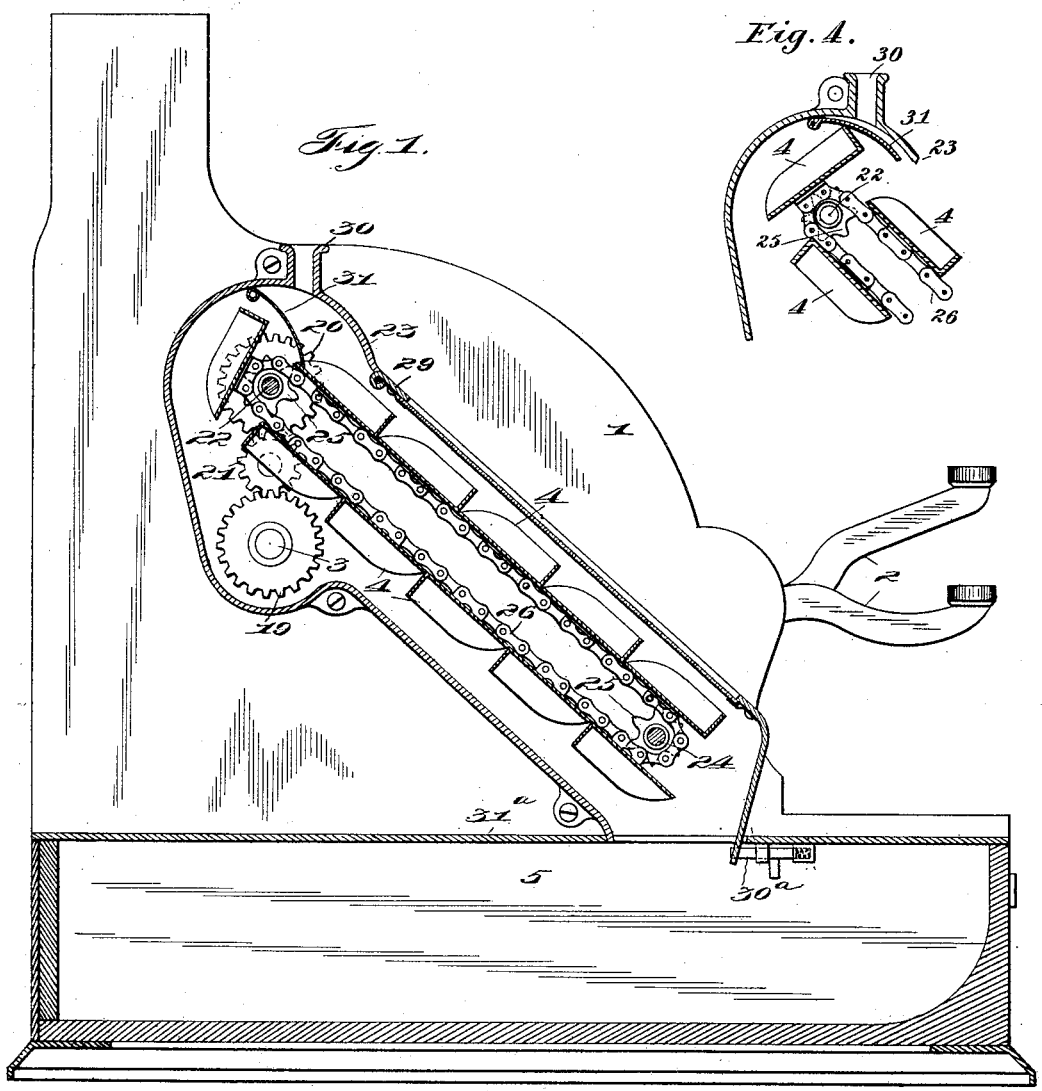

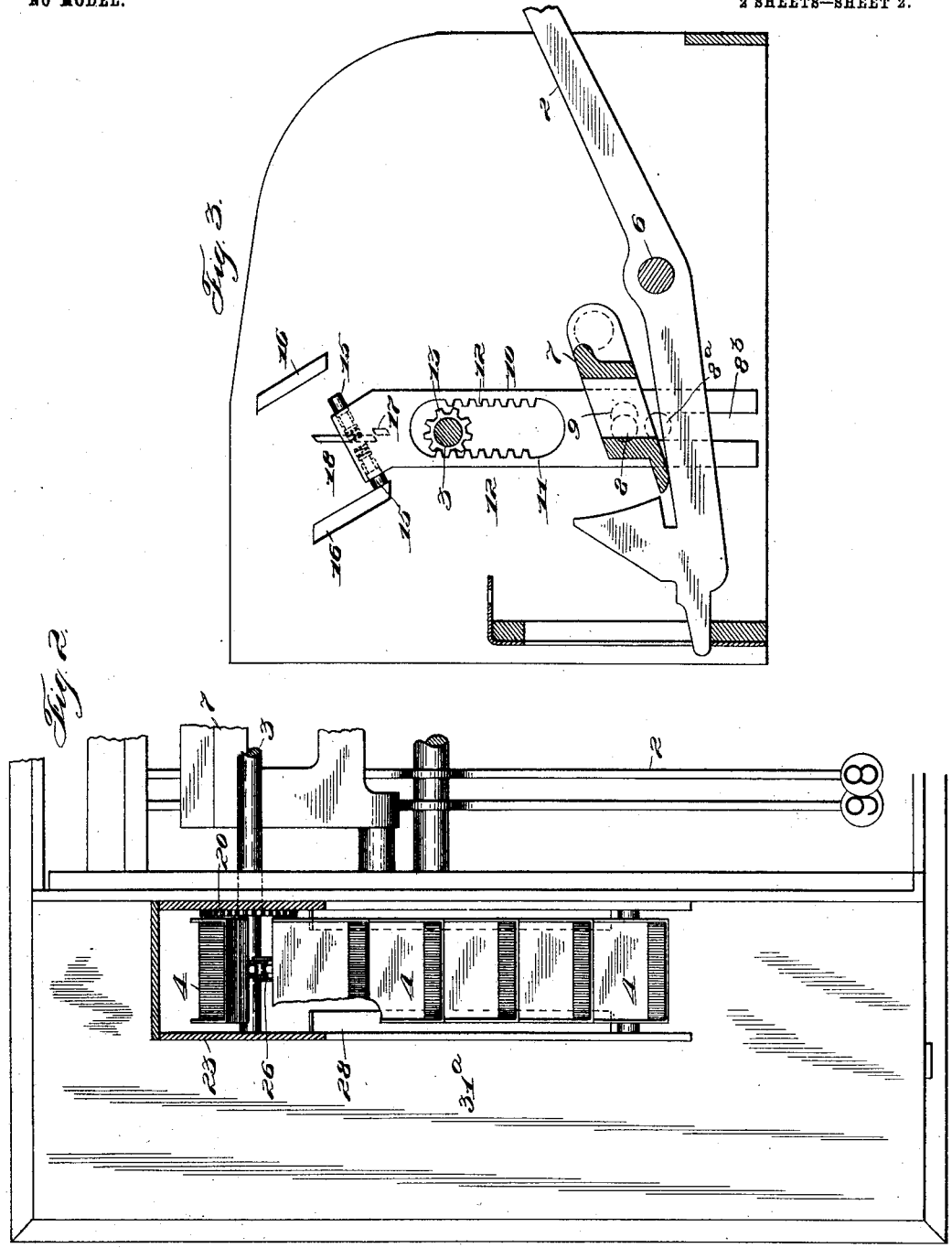

UNITED STATES PATENT OFFICE.

THOMAS CARROLL, OF DAYTON, OHIO, ASSIGNOR TO THE NATIONAL CASH REGISTER COMPANY, OF DAYTON, OHIO, A CORPORATION OF NEW JERSEY.

CASH-REGISTER.

SPECIFICATION forming part of Letters Patent No. 755,356, dated March 22, 1904.

Application filed April 7, 1899. Serial No. 712,064. (No model.)

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to improvements in coin-displayers for the same.

The primary object of the invention is the application of an improved coin-displayer to a cash-register. I have shown my invention as applied to a machine of the class patented to Thomas Carney September 6, 1892, and No. 482,161, although I do not care to limit myself to such application, as my invention may be applied with equal facility to any cash-register containing a rotary shaft.

In the accompanying drawings, forming part of this specification, Figure 1 represents a transverse vertical section through the devices embodying my invention applied to a machine of the type mentioned. Fig. 2 represents a partial top plan view, partly in section and partly broken away, of the same. Fig. 3 represents a vertical transverse section taken through the cash-register proper, the cash-drawer being omitted; and Fig. 4 represents a detail elevation, partly in section and partly broken away, showing the position the parts assume when one of the coin-buckets contacts with the chute-guard and closes the chute.

In the said drawings, 1 represents the frame of the machine; 2, the operating-keys; 3, the rotation-shaft; 4, the coin-receiving buckets or pockets, and 5 the money-drawer.

The operation of the amount-keys in connection with the rotation-shaft is substantially similar to that of the before-mentioned patent and may be briefly described as follows: Each key 2 is pivotally mounted upon a transverse shaft 6 and is adapted when operated to raise and lower a key-coupling frame 7, pivotally mounted in the main frame, so as to extend above all of the keys to the rear of the journal-shaft 6. The said frame 7 is provided at one end with an antifriction-roller 8, which projects into a transverse slot 9, formed in a vertically-movable bar 10, so as to raise and lower said bar with the frame. Said bar is guided in its movements by a pin $8^a$, mounted on the main frame and projecting into a guiding-slot $8^b$, formed in said bar. This bar is further formed with a vertical slot 11, having gear-teeth 12 formed on its walls and adapted to engage a pinion 13, which projects into said slot, but is only of sufficient diameter to engage one set of gear-teeth at a time. This pinion is mounted rigidly upon the rotation-shaft 3, so as to impart its motion to the same. The upper portion of the bar 10 is provided with two spring-pressed plungers 15, arranged upon opposite sides of the same and adapted to bear, respectively, against incline flanges 16, rigidly mounted upon the main frame. This bar is further provided near its upper end with a laterally-projecting stud 17, having upper and lower incline sides and arranged to coact with a vertical flange 18, mounted on the main frame. By this peculiar structure the shaft 3 is given a rotary movement as the bar 10 moves up and down as first one set of gear-teeth engage the pinion 13 and then the other. As the bar moves up, the stud 17 rides in front of the flange 18; but when it reaches the top of the same it is forced over by the forward spring-pressed plunger, which has meanwhile been compressed by its incline flange 16, so as to travel down upon the opposite side of said flange 18. The remaining spring-pressed plunger then forces it at the end of its lower stroke into its normal position ready for the next operation of the machine.

The devices above described are old and already described in the above-mentioned patent and are simply described here to more clearly demonstrate the operation of my improved devices in connection with this class of machine. The extreme outer end of the shaft 3 is provided with a gear-wheel 19, fast thereto and adapted to actuate a similar gear 20 through an intermediate idle pinion 21, which latter is suitably journaled on the main frame. The said gear 20 is fast upon a short shaft 22, journaled in the auxiliary coin-displayer casing 23, which is suitably secured upon the main frame. This shaft 22, as well as a similar shaft 24, mounted near the lower end of the casing 23, is provided with a sprocket-wheel 25, an endless sprocket chain or belt 26 passing about said wheels. This chain supports a number of metallic pockets or coin-receptacles 4, which are riveted fast to the links of said chain, so as to move therewith. The projecting sides of said receptacles when they are in displaying position rest upon side flanges 28 of the casing 23 and are thus held straight in relation to the casing and in relation to each other. The upper incline portion of the casing 23 is provided with a hinged cover 29, having a glass-covered sight-aperture, through which all the coin-receptacles upon the upper half of the chain may be seen. The lower end of this cover is arranged to be engaged by a spring-latch $30^a$, mounted within the drawer-casing $31^a$ of the drawer 5, so that none save those having access to said drawer can release the latch and open the cover. A coin-chute 30 is also arranged near the top of the casing 23 to guide the coin inserted into the uppermost receptacle. In order to prevent the coins from dropping back in the casing or being inserted at a time when there is no receptacle in the proper position to receive them, I provide a pivoted lip or guard 31 within the casing 23 immediately below the chute 30. The position of this guard is such that when a receptacle is turning about the upper sprocket-wheel with the chain it strikes and forces the lip upward, and thus closes the chute until said receptacle has reached a position in which it is ready to receive the coin, when the lip again descends and acts as a guide to cause the coin to pass smoothly into said receptacle or pocket. The movement of the chain at each operation of the keys and rotary shaft, as above described, is just sufficient to bring a fresh coin-receptacle into position to receive the coin, and as said receptacle has, as shown, no wall at its upper end the coin readily slips over the lip 31 and into the same. As a coin passes downward with the chain it is visible through the glass cover for four successive operations of the machine, and when the receptacle turns the lower sprocket-wheel the coins therein fall through the lower open bottom of the casing into the auxiliary cash-drawer 5, from which they may be removed by the person having access thereto.

By the employment of this device there can be no mistake as to the amount or money received, as the coins remain in sight after being placed in the displayer for four consecutive operations.

Having thus described my invention, what I claim as new, and desire to secure by Letters Patent, is—

1. In a cash-register, the combination with a series of keys, of an operating device actuated thereby, a coin-conveyer connected to the operating device comprising an endless chain having coin-receiving buckets which are open at one end only, a coin-chute which is arranged to discharge coins into the open end of said buckets, and a movable guard normally positioned to guide the coins from the chute into the buckets and adapted to be displaced by the buckets to close the chute.

2. In a cash-register, the combination with operating devices, of a casing having a sight-opening, an endless coin-conveyer in said casing having coin-supporting projections, a chute for introducing coins to said conveyer and a movable guard for said chute arranged to be operated to close the chute by being struck by the coin-supporting projections.

3. In a cash-register the combination with an inclosing casing having spaced supporting-flanges therein, an endless coin-conveyer comprising coin-buckets which are arranged to extend across between and slide on said flanges and a connecting-belt which passes between and free of said flanges, a coin-chute arranged to discharge into said buckets, and a movable guard normally positioned to guide the coins from the chute into the buckets and adapted to be displaced by the buckets to close the chute.

4. In a cash-register, the combination with operating devices, of a coin-conveyer provided with a series of coin-receiving buckets, a chute for introducing coins to said buckets, and a movable guard for said chute arranged to be operated by the contact of said buckets to close the chute.

5. In a cash-register, the combination with operating devices, of a coin-conveyer, a movable cover for the same, a cash-drawer and a lock for said cover only accessible for operation by hand when the drawer is open.

6. In a cash-register, the combination with operating devices, of an endless coin-conveyer, a hinged cover for the same, a cash-drawer arranged to receive the coins from the conveyer and a latch for the said cover only accessible for operation by hand when the drawer is open.

7. In a cash-register, the combination with an inclosing casing having a sight-opening and a coin-receiving passage, of an endless coin-conveyer mounted in said casing and having coin-receiving buckets and a hinged guard operated by the coin-buckets for closing the coin-receiving passage.

8. In a cash-register, the combination with an inclosed casing having a sight-opening and a coin-receiving passage, of an endless coin-conveyer mounted in said casing and having coin-receiving buckets, and a movable guard normally positioned to guide the coins from the receiving-passage to the buckets and arranged to be displaced by the coin-buckets to close the coin-receiving passage, substantially as and for the purpose described.

9. In a cash-register the combination with operating devices, of a casing having a sight-opening, an endless coin-conveyer in said casing having coin-supporting projections, a chute for introducing coins to said conveyer and a movable guard for preventing the passage of the coins through the chute arranged to be operated by the endless conveyer.

10. In a cash-register the combination with operating devices, of a coin-displayer, a movable cover for said displayer, a cash-drawer arranged to receive the coins discharged from the displayer and a lock for said movable cover which becomes accessible for operation when the drawer is open.

11. In a cash-register, the combination with operating devices, of a coin-conveyer provided with a series of coin-receptacles, a chute for introducing coins to said receptacle, and a movable guard normally positioned to guide the coins from the chute into the receptacles and adapted to be displaced by the coin-receptacles to close the chute.

In testimony whereof I affix my signature in the presence of two witnesses.

THOMAS CARROLL.

Witnesses:
   ALVAN MACAULEY,
   WILLIAM MUZZY.